Patented Feb. 9, 1926.

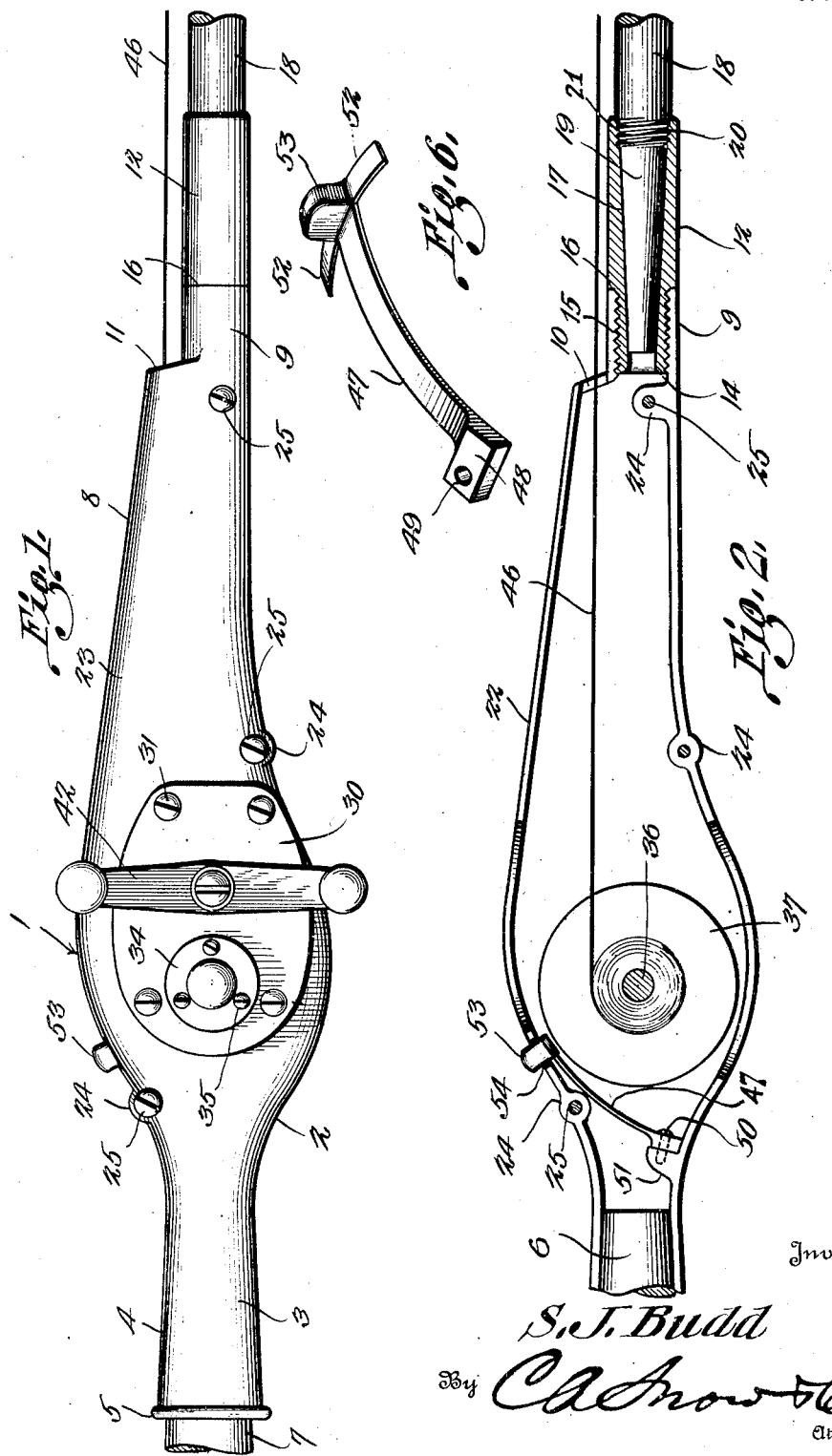

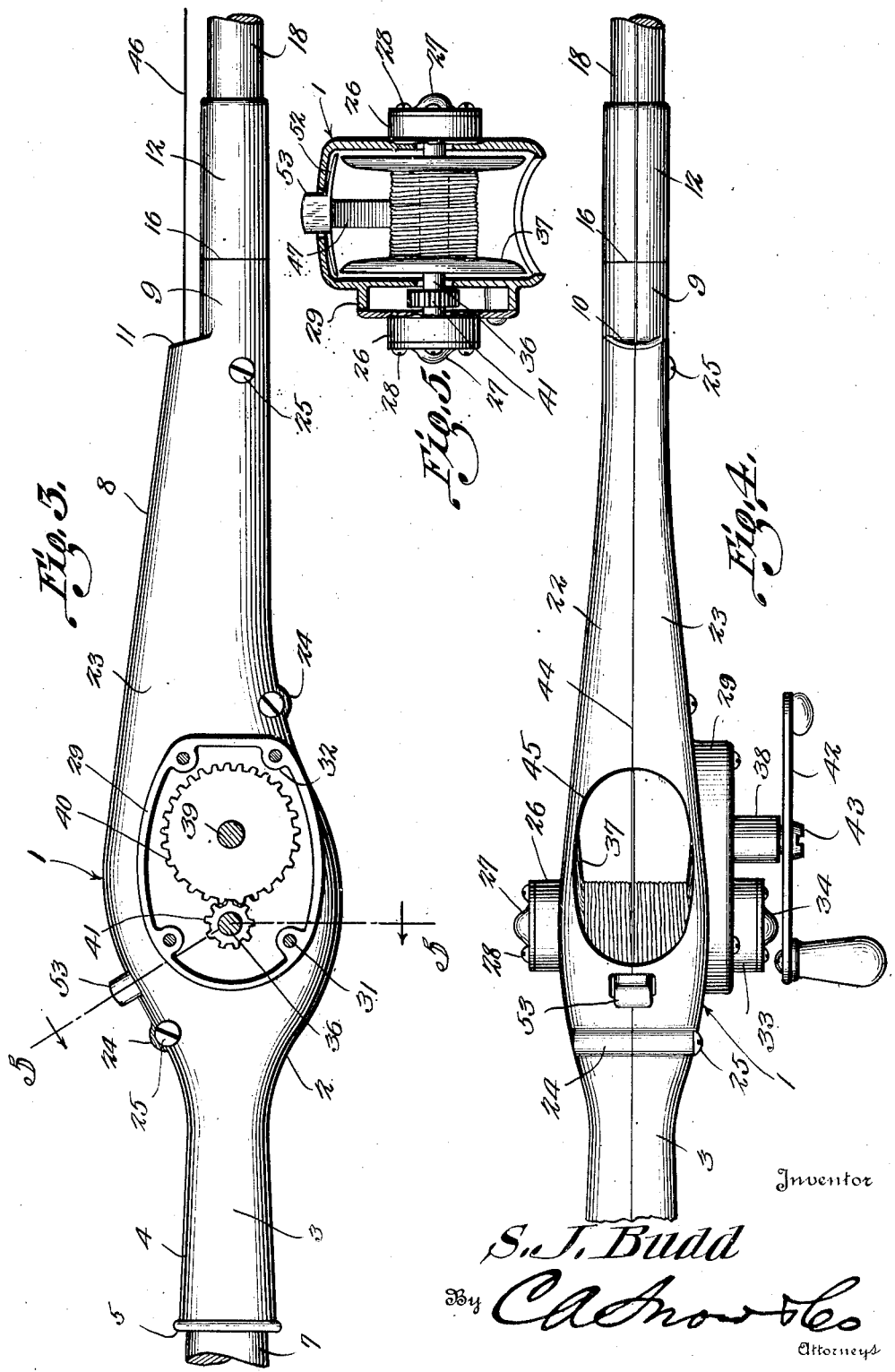

1,572,104

UNITED STATES PATENT OFFICE.

SELDEN J. BUDD, OF MANHASSET, NEW YORK, ASSIGNOR OF ONE-HALF TO CHARLES W. SMITH, OF GREAT NECK, NEW YORK.

FISHING REEL.

Application filed April 16, 1925. Serial No. 23,650.

*To all whom it may concern:*

Be it known that I, SELDEN J. BUDD, a citizen of the United States, residing at Manhasset, Long Island, in the county of Nassau and State of New York, have invented a new and useful Fishing Reel, of which the following is a specification.

This invention aims to provide novel means whereby a fishing line reel may be held assembled with the butt and with the rod of a fishing pole. Another object of the invention is to provide novel means for mounting the reel.

It is within the province of the disclosure to improve generally and to enhance the utility of devices of that sort to which the invention appertains.

Although a preferred form of the invention has been shown, it will be understood that a mechanic, working within the scope of what is claimed, may make such changes as his skill may suggest, without departing from the spirit of the invention.

In the accompanying drawings:—

Figure 1 shows, in side elevation, a device constructed in accordance with the invention; Figure 2 is a longitudinal section wherein parts appear in elevation; Figure 3 is a side elevation, a portion of the casing being removed, and parts appearing in section; Figure 4 is a top plan; Figure 5 is a section on the line 5—5 of Figure 3; Figure 6 is a perspective view of the brake.

The device forming the subject matter of this application preferably is made of metal throughout, and viewed in one aspect, embodies a means for connecting the butt and the rod of a fishing pole. Having this consideration in mind, the device comprises a hollow body 1, which tapers rearwardly as at 2, to form a reduced socket 3 which is flared as at 4 to form a conical bore that is widest at the rear end 5 of the part 3. The numeral 7 marks the butt of a fishing pole, having a tapered part 6 which is wedged in the conical bore of the flared socket 3. As shown at 8, the body 1 tapers forwardly and terminates in a reduced tubular and cylindrical extension 9, that end 11 of the body 1 which is adjacent to the inner end of the extension 9 being open, as shown at 10, for the passage of a line.

The device embodies a ferrule 12 having a reduced end 14 forming a shoulder 16, the reduced end 14 of the ferrule 12 being threaded as at 15, into the tubular extension 9, the shoulder 16 abutting against the end of the extension 9. The ferrule 12 has a tapered bore 17. Throughout the major portion of its length, the bore 17 is smooth, but throughout a small portion of its length, at the outer end of the ferrule 12, the bore 17 is threaded, as shown at 20. The numeral 18 denotes a section of a fishing rod having a conical end 19 received in the bore 17, the part 19 being smooth throughout the major portion of its length, but including a short threaded part 21, adapted to coact with the threaded portion 20 of the ferrule 12.

Considered as a means for connecting the butt 7 with the pole or rod part 18, the device is strong, compact, and one which, as a matter of test and practice, can be turned out cheaply and be well adapted to withstand the severe use to which devices of this kind are subjected.

The body 1 is made up of laterally separable sections 22 and 23 having lugs 24 receiving securing elements 25, such as screws, whereby the sections 22 and 23 of the body are held together.

A bearing casing 26 projects laterally from the section 22 and carries a lid 27 held in place by securing elements 28. The section 23 has a laterally projecting chamber 29 to which a lid 30 is attached by securing elements 31, the chamber having bosses 32 into which the securing elements 31 are threaded. A bearing casing 33 propects outwardly from the lid 30 of the chamber 29 and carries a cover 34 held in place by securing members 35. The casings 26 and 33 are adapted to contain the usual anti-frictions (not shown), and in those bearings, the shaft 36 of a reel 37 is journaled, the reel 37 being located within the body 1. The lid 30 for the chamber 29 has an outstanding bearing 38. In the bearing 38 and in the opposite portion of the member 23, a shaft 39 is journaled, a gear wheel 40 being secured to the shaft 39 and meshing with a pinion 41 secured to the shaft 36 of the reel 37, the gear wheel 40 and the pinion 41 being housed within the chamber 29. The parts 40 and 41 may be taken to represent a multiplying train of any desired sort. A crank 42 is secured at 43 to the outer end of the shaft 39. The parts 22 and 23 of the body 1 are provided in their meeting edges 44 with notches defining oppositely disposed openings 45 giving access to the reel 37, so that the fishing line 46 may be conveniently assembled with the reel, the line 46 passing outwardly through the opening 10, as shown best in Figure 2 of the drawings.

The brake is in the form of a spring arm 47 having a thickened base 48 provided with an opening 49 adapted to receive a securing device 50 whereby the arm 47 is connected to an inwardly projecting bracket 51 on the section 22 of the body 1. Here note that since the spring brake arm 47 is connected to the section 22 only the sections 22 and 23 may be separated without disturbing the brake. The arm 47 has lateral fingers 52. A button 53 projects from the arm 47 at the place where the fingers 52 project from the arm, the button 53 extending through an opening 54 formed by notches in the sections 22 and 23. By pressing inwardly on the button 53, the fingers 52 may be made to bear upon the edge portions of the reel 37, and, thus, the rotation of the reel 37 may be checked.

Having thus described the invention, what is claimed is:—

1. In a means for connecting the butt and the rod of a fishing pole, a hollow body which tapers rearwardly to form a reduced socket, the body tapering forwardly and terminating in a reduced cylindrical extension, that portion of the body which is adjacent to the inner end of the extension being open for the passage of a line, a ferrule having a reduced end defining a shoulder, the reduced end of the ferrule being threaded into the extension, and the shoulder cooperating with the end of the extension, the ferrule having a tapered bore, the major portion of which is smooth and the outer end of which is threaded, a pole having a smooth conical end received in the smooth portion of the bore of the ferrule, the pole also having a short threaded part cooperating with the threaded part of the ferrule, a butt mounted in the socket, and a reel journaled in the body.

2. In a device of the class described, a hollow body which tapers rearwardly to form a reduced socket, the body tapering forwardly and terminating in a reduced cylindrical extension, that portion of the body which is adjacent to the inner end of the extension being open for the passage of a line, a ferrule having a reduced end defining a shoulder, the reduced end of the ferrule being threaded into the extension, and a shoulder cooperating with the end of the extension, the ferrule having a tapered bore, the major portion of which is smooth, the outer end of which is threaded, and a reel journaled in the body.

3. In a device of the class described, a hollow body made up of first and second laterally separable sections, and means for connecting said sections, the first section having a laterally outstanding bearing casing, the second section having a laterally outstanding chamber, a lid for the chamber and having a laterally outstanding bearing casing, means for securing the lid to the chamber, a shaft journaled in both bearing sections, a reel carried by the shaft and located in the body, a second shaft journaled in the lid, and a multiplying train connecting the shafts, the train being housed in the chamber.

4. In a device of the class described, a hollow body made up of laterally separable sections, means for connecting said sections, a shaft journaled in said sections, a reel carried by the shaft, a brake coacting with the reel, and means for securing the brake to one of said sections, to the exclusion of the other of said sections, whereby the sections may be separated without disturbing the mounting of the brake.

In testimony that I claim the foregoing as my own, I have hereto affixed my signature.

SELDEN J. BUDD.